United States Patent [19]

Varga

[11] 4,230,005
[45] Oct. 28, 1980

[54] TRAVELING CIRCULAR SAW

[76] Inventor: Ferenc Varga, Combette 22, 3280 Murten, Switzerland

[21] Appl. No.: 5,480

[22] Filed: Jan. 22, 1979

[30] Foreign Application Priority Data

Jan. 2, 1978 [CH] Switzerland .................. 1107/78

[51] Int. Cl.³ ............................................. B27B 5/18
[52] U.S. Cl. ........................................ 83/100; 83/102.1;
83/169; 83/374; 83/477.2; 83/478; 83/489
[58] Field of Search .................. 83/100, 102.1, 169, 83/478, 477.2, 455, 374, 485, 489

[56] References Cited

U.S. PATENT DOCUMENTS

| 478,935 | 7/1892 | Karshner | 83/485 X |
|---|---|---|---|
| 2,823,711 | 2/1958 | Kaley | 83/102.1 |
| 3,339,597 | 9/1967 | Kohler | 83/478 X |
| 3,463,040 | 8/1969 | Pouilloux | 83/374 |
| 3,570,562 | 3/1971 | Tracy | 83/485 |
| 3,656,519 | 4/1972 | Stackhouse | 83/102.1 |
| 3,807,268 | 4/1974 | Bacon | 83/485 X |
| 3,884,101 | 5/1975 | Silkin | 83/478 X |
| 3,961,548 | 6/1976 | Claassen | 83/169 |
| 4,041,823 | 8/1977 | Ashbrook | 83/478 |

*Primary Examiner*—Frank T. Yost
*Attorney, Agent, or Firm*—Wender, Murase & White

[57] ABSTRACT

A cutting machine particularly for cutting plates of plastic material and non-ferrous metal sheets, having a cutting blade rotating in such a direction that its cutting rim enters into a guard casing at the cutting place, said guard casing having a rim closely adjacent said cutting blade at least near the cutting place, and said rim being pressed against the material to be cut near said cutting place thereby preventing bending, deformation and splitting of said material by the cutting forces.

10 Claims, 4 Drawing Figures

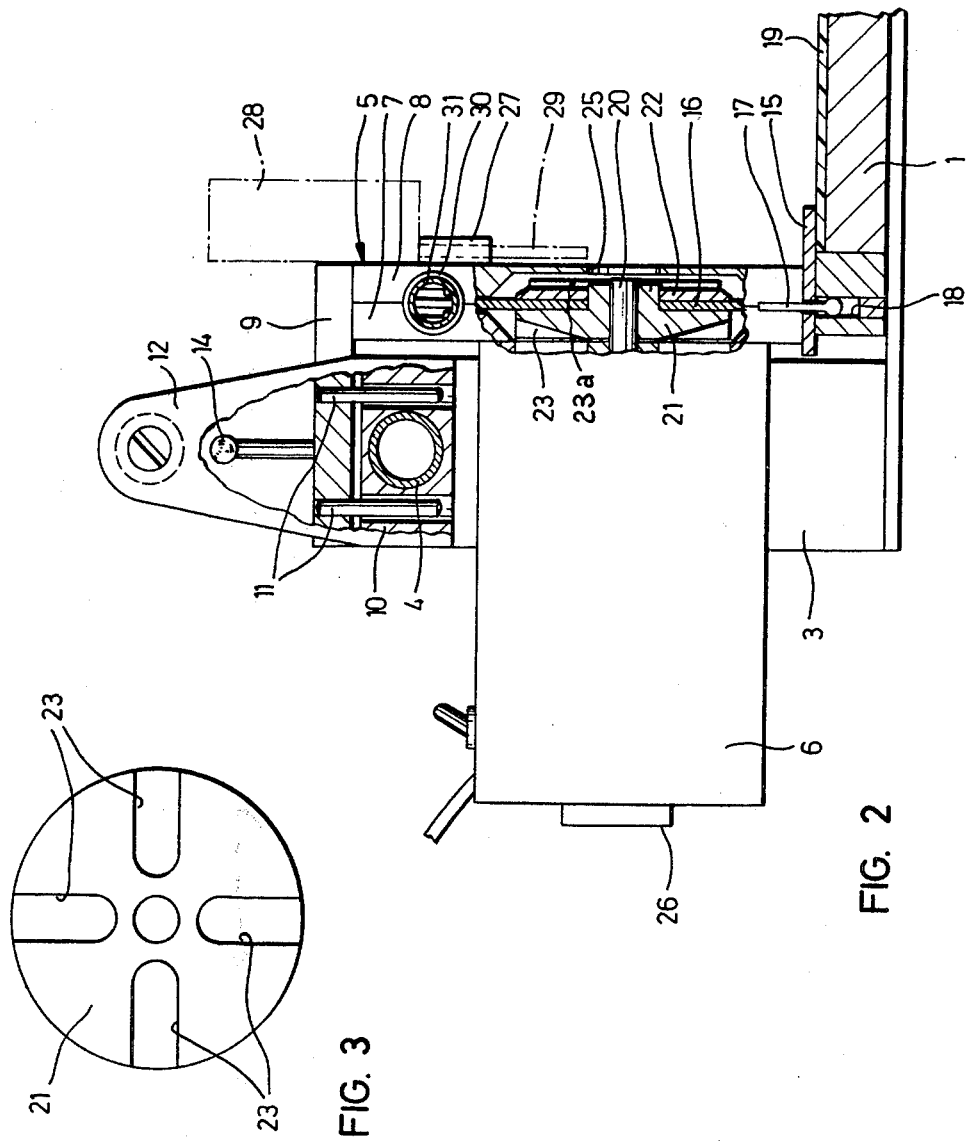

TRAVELING CIRCULAR SAW

BACKGROUND OF THE INVENTION

This invention relates to a cutting machine having a table for the material to be cut and at least one cutting blade rotatably accommodated in a protecting casing or guard casing, a motor for driving said cutting blade in such a direction that the portion of said cutting blade projecting from the guard casing enters into said guard casing at the cutting place, a rim defining an opening of said guard casing through which said blade projects. With a prior machine of this type disclosed in U.S. Pat. No. 3,339,597 it is not possible to cut plates of plastic material, particularly of reinforced plastic material and non-ferrous metal sheets cleanly simply and accurately. Due to the cutting forces the edges of the cut are deformed locally broken away or splitted by the blade which leaves the material to be cut at the cutting place.

SUMMARY OF THE INVENTION

It is an object of this invention to provide a cutting machine allowing clean accurate and simple cutting of plastic material whether reinforced or not and of non-ferrous metal sheets. To this end the machine according to this invention comprises a rim defining said opening of the guard casing closely adjacent said blade at least near said cutting place, means for applying said rim of the guard casing onto the material to be cut, and means for applying said guard casing with its said rim against the material to be cut at least near said cutting place in order to prevent bending and splitting of the material by the cutting forces of said blade. In order to obtain an accurate and clean cut a particularly simple and efficient guide system for shifting the cutting unit consisting of the cutting blade, its motor and the guard casing in a direction parallel to the table is needed. This guide means include one single guide rod in combination with a separating tong engaging a groove of the table as a second guide element. In this way a particularly accurate guiding is obtained in immediate proximity of the cutting place and the guide means are not liable to tilting and jamming.

Clean cutting is further improved by the evacuation or removal of chips and dust through an outlet duct of said guard casing, whereby the fan action of the cutting blade may be sufficient for producing an air circulation able to transport the chips and dust. By means of grooves at the inside of the guard casing forming a channel for the removal of chips and dust, such particles are completely removed and cannot be recycled to the cutting place, this improving the quality of the cutting. Preferably, mounting discs for the cutting blade have radial grooves and ribs for increasing their ventilator or fan action. Air may be sucked in through the motor for efficiently cooling the same.

The ventilator or fan action of the cutting blade and its mounting discs may also be used for introducing a lubricating agent to the cutting blade.

It is another aim of this invention to provide for a particularly handy operation of the cutting unit by means of a handle for lifting this unit for insertion of the material to be cut, this handle being located below a fixed hand rest, this allowing to grasp with one hand the handle and the hand rest for at the same time lifting the cutting unit and shifting it along said guide means.

BRIEF DESCRIPTION OF THE DRAWINGS

This invention will now be explained in further detail with reference to the accompanying drawings showing by way of example an embodiment of the invention.

FIG. 2 is a side view of the cutting machine, partly in section,

FIG. 3 is a front view of one of the mounting discs for the cutting blade and

DETAILED DESCRIPTION OF THE DRAWINGS

Figure 1:
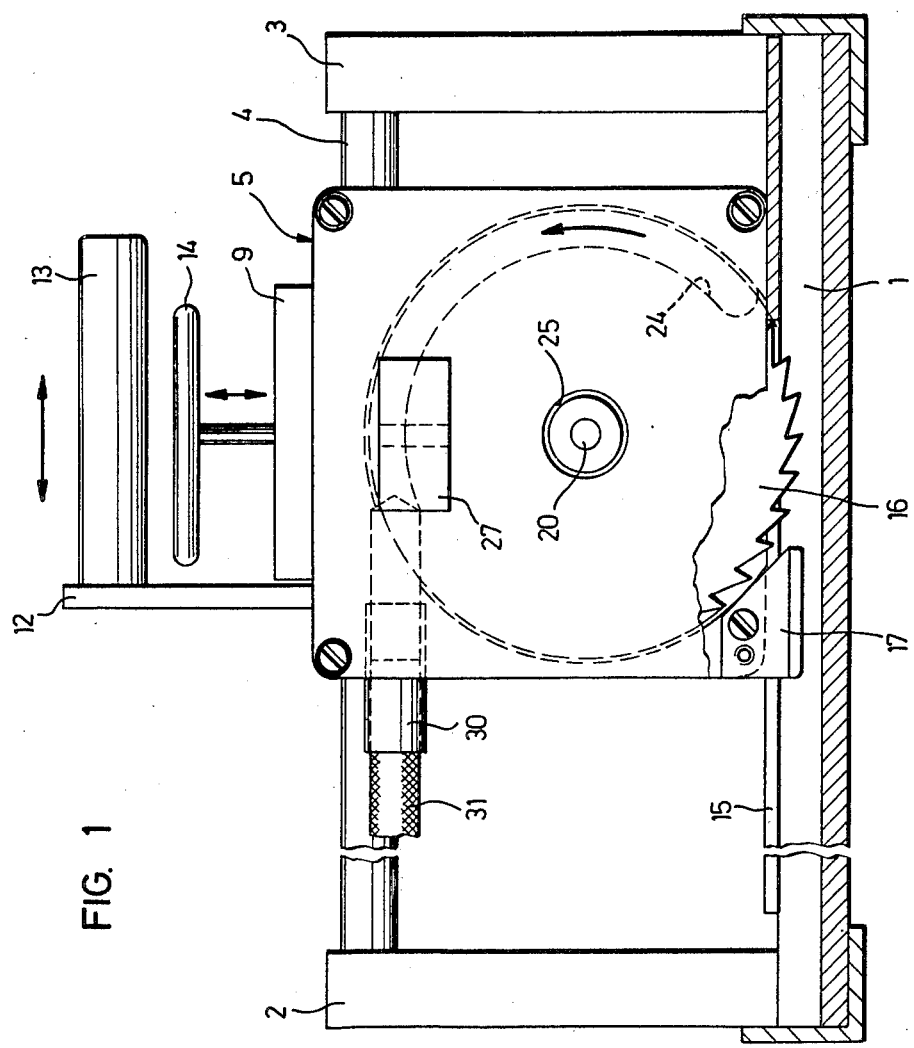
FIG. 1 is a front view of the cutting machine, partly in section.

As may be seen from FIGS. 1 and 2 the cutting machine has a base plate 1 forming a table with vertical struts 2 and 3. A longitudinal guide 4 made of a cylindrical metal tube is mounted between struts 2 and 3. The cutting blade 16 and a guard casing 5 together with a motor 6 form a cutting unit which may be horizontally shifted along guide 4. The guard casing 5 is made of two plates 7 and 8. At the top end of the casing 5 is mounted a vertical slide 9 guided for vertical displacement in a horizontal slide 10 by means of pins 11. The horizontal slide together with the whole cutting unit may be displaced by means of the handle or hand rest 13 along the longitudinal guide rod 4. This handle 13 is mounted to the horizontal slide 10 by means of a vertical plate 12. A lifting handle 14 is mounted on the vertical slide 9. By means of this lifting handle 14 which is located below the hand rest or handle 13 the cutting unit may be lifted off the base plate or table 1 and from the material to be cut 15 respectively, whereby the upper handle 13 serves as a hand rest. Both handles 13 and 14 may easily be gripped by one hand for lifting the cutting unit and for shifting it horizontally. The cutting unit may be lifted until the motor 6 abuts against the horizontal slide 10. This stroke is so dimensioned that a person operating the cutting machine cannot insert a finger between the guard casing and the table into reach of the cutting blade. In order to reach the desired position of the cutting unit above the material to be cut, the cutting unit is lifted by means of handle 14 and then displaced along guide 4 by means of handle 13.

The separating tong 17 connected to the guard casing 5 engages a guide groove 18 and is accurately guided in this groove by its lower ball - shaped end. This tong and groove together with guide rod 4 forms an accurate guide means for the cutting unit, and tilting and jamming of the cutting unit on such guide means is impossible.

Figure 4:
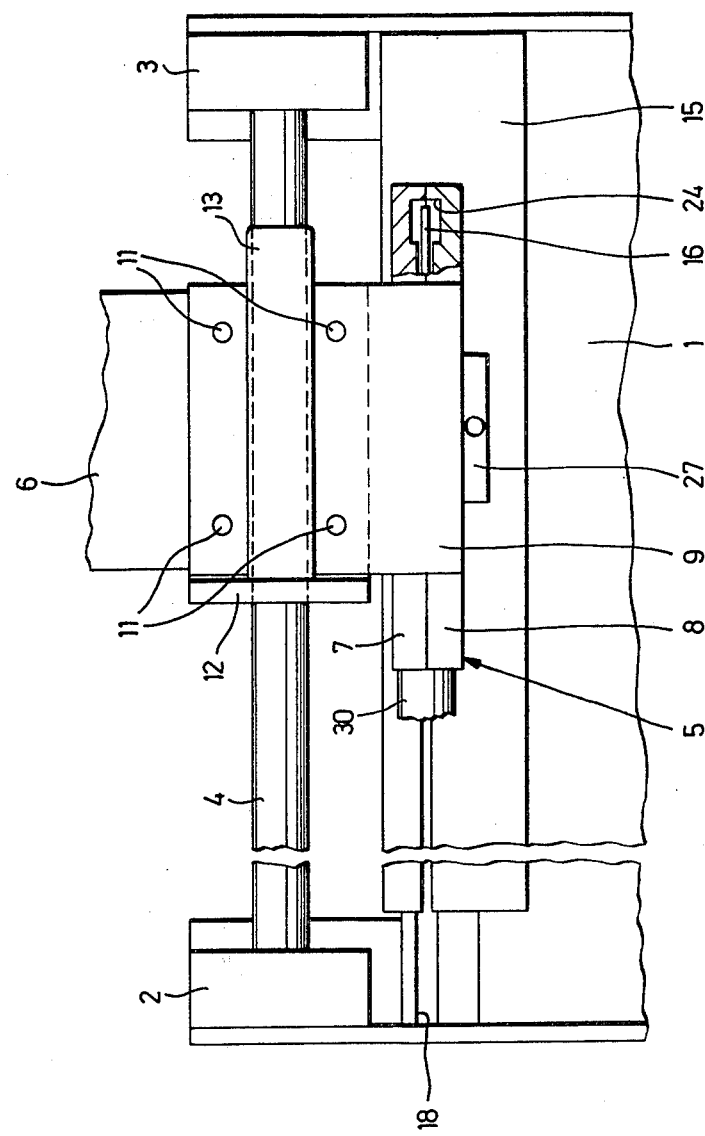
FIG. 4 is a top view of the machine, partly in section.

During the cutting operation the lower plane surface of the guard casing is applied in close proximity of the cutting place against the material 15 to be cut. The cutting blade is rotating in anticlockwise direction as seen in FIG. 1 and therefore, the cutting place is at the right end of the cut where the teeth of the blade 16 enter from below into the guard casing. At this place the lower surface of the guard casing has a rim closely adjacent the blade. As particularly seen in FIG. 4, the clearance between the plates 7 and 8 of the gard casing and the cutting blade is very small such that the lower rim of the casing defining the opening through which the cutting blade projects is very closely adjacent the blade. Thereby pressure of this rim against the material to be cut effeciently prevents deformation and splitting of the material by the cutting forces of the blade at the cutting place. At the same time the pressure of the guard casing against the material to be cut prevents vibration and sliding of this material on the table. By these effects an accurate clean cut is obtained.

The table 1 has a tough and elastic coating 19 whereon the material 15 to be cut is supported without danger of gliding. This also attributes to the obtainment of clean cuts and the accuracy is improved.

The cutting blade 16 is fixed to the motor shaft 20 by means of an inner flange or disc 21 and an outer flange or disc 22. As seen from FIG. 2 the disc 21 is so shaped that its fan effect at high speed of the motor is improved. FIG. 3 shows a front view of the inner fixing disc 21. This disc 21 has four radial grooves 23. Similarly the disc 22 may have radial grooves 23a for improving the fan effect. Discs 21 and 22 are interconnected by means of screws projecting transversally through the cutting blade, such screws being not shown in the drawing.

The guard casing 5 has a curved collecting channel 24 for chips and dust. This channel is formed by grooves at the inside of each of the plates 7 and 8 of the casing, such grooves ending in front of a tangential outlet duct 30 for dust and chips. In the collecting channel 24 extending substantially from the cutting place to the outlet duct 30 a stream of air sucked in though apertures 25 and 26 is produced for proper transport of chips and dust from the cutting place to the outlet duct 30. Air sucked in at aperture 26 passes through the motor and efficiently cools the same.

A mounting bracket 27 for a container 28 for a lubricating agent is mounted on the front plate 8 of the gard casing 5. The lubricating agent is fed through a conduit 29 to the air inlet aperture 25 and is transported to and distributed on the cutting blade by the air stream entering at aperture 25. Lubrification is required when non-ferrous metal sheets are cut. In this case and other cases, a cutting blade without teeth consisting of a grinding material may be used. The used lubricating agent is removed with the chips and dust through the outlet duct 30 and conduit 31.

Various materials may be cut without substantial adaptation of the machine. Accidents are practically excluded and the machine operates without molestation of the operator by dust. Operation is easy and may be carried out by semi skilled staff.

What I claim is:

1. A cutting machine, particularly for plates of plastic material and non-ferrous metal sheets, having a table for the material to be cut and at least one cutting blade rotatably accommodated in a flat protecting casing or guard casing, a motor for driving said cutting blade in such a direction that the portion of said cutting blade projecting from the guard casing enters into said guard casing at the cutting place, a rim defining an opening of said guard casing through which said blade projects, said rim being closely adjacent said blade at least near said cutting place, and means for applying said guard casing with said rim against the material to be cut at least near said cutting place in order to prevent bending and splitting of the material by the cutting forces of said blade entering into the guard casing.

2. A cutting machine, particularly for plates of plastic material and non-ferrous metal sheets, having a table for the material to be cut and at least one cutting blade rotatably accommodated in a protecting casing or guard casing, a motor for driving said cutting blade in such a direction that the portion of said cutting blade projecting from the guard casing enters into said guard casing at the cutting place, a rim defining an opening of said guard casing through which said blade projects with very small clearance, said rim thus being closely adjacent said blade at least near said cutting place, said guard casing, cutting blade and motor together defining a cutting unit, first means for shifting said cutting unit longitudinally in a direction parallel to said table and parallel to the plane of said cutting blade for cutting with and resetting of the cutting unit, and second means for shifting said cutting unit in a direction perpendicular to said table and parallel to the plane of said cutting blade for uniformly applying said guard casing with said rim against the material to be cut at least near said cutting place in order to prevent bending and splitting of the material by the cutting forces of said blade entering into the guard casing and for lifting off said cutting unit from said table and from said material to be cut, respectively.

3. A cutting machine, particularly for plates of plastic material and non-ferrous metal sheets, having a table for the material to be cut and at least one cutting blade rotatably accommodated in a protecting casing or guard casing, a motor for driving said cutting blade in such a direction that the portion of said cutting blade projecting from the guard casing enters into said guard casing at the cutting place, a rim defining an opening of said guard casing through which said blade projects, said rim being closely adjacent said blade at least near said cutting place, said guard casing, cutting blade and motor together defining a cutting unit, first means for shifting said unit in a horizontal direction parallel to said table, and second means for shifting said unit in a vertical direction, said cutting unit having a handle for lifting it, and a fixed hand rest located above said handle on a support shiftable along said first means, said guard casing with said rim being applied against the material to be cut at least near said cutting place in order to prevent bending and splitting of the material by the cutting forces of said blade when said handle is released for lowering said cutting unit.

4. A cutting machine, particularly for plates of plastic material and non-ferrous metal sheets, having a table for the material to be cut and at least one cutting blade rotatably accommodated in a protecting casing or guard casing, a motor for driving said cutting blade in such a direction that the portion of said cutting blade projecting from the guard casing enters into said guard casing through which said blade projects, said rim being closely adjacent said blade at least near said cutting place, a single guide rod allowing shifting of said guard casing, blade and motor parallel to said table, a separating tong mounted on said guard casing engaging a guide groove of said table as an additional guide means, for accurately keeping said guard casing and blade in a cutting position, and means for applying said guard casing with said rim against the material to be cut at least near said cutting place in order to prevent bending and splitting of the material by the cutting forces of said blade.

5. A machine according to claim 4, wherein said blade also engages into said groove of the table.

6. A machine according to claim 1, wherein said guard casing has an outlet duct for chips and dust, said guard casing having grooves at its inside forming an outlet channel extending from said cutting place and entering place of said blade respectively to said outlet duct for removal of said chips and dust.

7. A machine according to claim 6, wherein said guard casing has air admission apertures near the center of said blade, air being sucked through said apertures and blown out through said outlet channel and outlet duct respectively.

8. A machine according to claim 7, wherein air is sucked in through said motor.

9. A machine according to claim 6, having mounting discs at each side of said blade, at least one of said discs having radial grooves for increasing the fan action thereof.

10. A machine according to claim 1, comprising a container containing a lubricating agent and a lubricating conduit having an outlet aperture near said blade, lubricating agent being fed to and distributed on said blade by the air circulation produced by the rotation of said blade.

* * * * *

UNITED STATES PATENT AND TRADEMARK OFFICE
CERTIFICATE OF CORRECTION

PATENT NO. : 4,230,005
DATED : October 28, 1980
INVENTOR(S) : FERENC VARGA

It is certified that error appears in the above-identified patent and that said Letters Patent are hereby corrected as shown below:

Title page, left column under the heading

Foreign Application Priority Data", the date

"Jan. 2, 1978" should be -- February 1, 1978 --.

Signed and Sealed this

Third Day of March 1981

[SEAL]

*Attest:*

RENE D. TEGTMEYER

*Attesting Officer*     *Acting Commissioner of Patents and Trademarks*